(12) United States Patent
Wu et al.

(10) Patent No.: US 8,270,333 B2
(45) Date of Patent: Sep. 18, 2012

(54) DATA RELAYING APPARATUS, COMMUNICATION APPARATUS, AND DATA RELAYING METHOD

(75) Inventors: Jianming Wu, Kawasaki (JP); Kazuhisa Obuchi, Kawasaki (JP); Tomohiko Taniguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 608 days.

(21) Appl. No.: 12/400,894

(22) Filed: Mar. 10, 2009

(65) Prior Publication Data

US 2009/0232043 A1 Sep. 17, 2009

(30) Foreign Application Priority Data

Mar. 14, 2008 (JP) .................................. 2008-066786

(51) Int. Cl.
*H04H 20/71* (2008.01)
(52) U.S. Cl. .......................... 370/312; 370/315; 375/214
(58) Field of Classification Search ........................ None
See application file for complete search history.

(56) References Cited

U.S. PATENT DOCUMENTS

| 6,101,523 | A * | 8/2000 | Chen et al. ..................... | 708/700 |
| 7,227,904 | B2 * | 6/2007 | Von Elbwart et al. ......... | 375/261 |
| 7,617,269 | B2 * | 11/2009 | Dewan ........................... | 708/700 |
| 7,920,501 | B2 * | 4/2011 | Larsson et al. ................. | 370/315 |
| 2005/0281221 | A1 * | 12/2005 | Roh et al. ....................... | 370/328 |
| 2007/0274324 | A1 | 11/2007 | Wu et al. | |

FOREIGN PATENT DOCUMENTS

WO 2006071187 7/2006

OTHER PUBLICATIONS

Rudolf Ahlswede, et al. "Network Information Flow" IEEE Transactions on Information Theory, vol. 46, No. 4, Jul. 2000, pp. 1204-1216.
Philip A. Chou, et al. "Network Coding for the Internet and Wireless Networks" IEEE Signal Processing Magazine, vol. 24, Issue 5, Sep. 2007, pp. 77-85.
Radhika Gowaikar, et al. "A Practical Scheme for Wireless Network Operation" IEEE Transactions on Communications, vol. 55, No. 3, Mar. 2007, pp. 463-476.
Tracey Ho, et al. "A Random Linear Network Coding Approach to Multicast" IEEE Transactions on Information Theory, vol. 52, No. 10, Oct. 2006, pp. 4413-4430.
Ralf Koetter, et al. "An Algebraic Approach to Network Coding" IEEE/ACM Transactions on Networking, vol. 11, No. 5, Oct. 2003, pp. 782-795.

(Continued)

*Primary Examiner* — Kwang B Yao
*Assistant Examiner* — Alex Skripnikov
(74) *Attorney, Agent, or Firm* — Katten Muchin Rosenman LLP (57) ABSTRACT

A data relaying apparatus for relaying data bidirectionally transmitted between a first communication apparatus and a second communication apparatus includes a first symbol string generator configured to generate, in accordance with a first modulation method, a first symbol string from first data transmitted from the second communication apparatus; a second symbol string generator configured to generate, in accordance with a second modulation method, a second symbol string from second data transmitted from the first communication apparatus; and a combining unit configured to combine a first symbol of the first symbol string and a second symbol of the second symbol string by calculating an exclusive OR on the first symbol and the second symbol to generate a third symbol string to be multicasted to the first communication apparatus and the second communication apparatus.

4 Claims, 9 Drawing Sheets

OTHER PUBLICATIONS

Sachin Katti, et al. "XORs in the Air: Practical Wireless Network Coding" SIGCOMM '06, Sep. 11-15, 2006, pp. 243-254.

Peter Larsson, et al. "Coded Bi-directional Relaying" The 5th Scandinavian WS on Wireless Ad-Hoc Networks (AdHoc '05), May 2005, pp. 851-855.

Petar Popovski, et al. "Wireless Network Coding by Amplify-and-Forward for Bi-Directional Traffic Flows" IEEE Communications Letters, vol. 11, No. 1, Jan. 2007, pp. 16-18.

Petar Popovski, et al. "The Anti-Packets Can Increase the Achievable Throughput of a Wireless Multi-Hop Network" IEEE ICC Proceedings, 2006, pp. 3885-3890.

Jianming Wu. "Symbol Level Multiplication based Network Coding" Fujitsu internal proposal, Sep. 28, 2007, pp. 1-12.

Korean Notice of Preliminary Rejection dated Oct. 29, 2010, from the corresponding Korean Application.

European Search Report dated Sep. 23, 2009, from the corresponding European Application.

Petar Popovski, et al. "Wireless Network Coding by Amplify-and-Forward for Bi-directional traffic flows" IEEE Communications Letters, vol. 11, No. 1, Jan. 1, 2007, pp. 16-18.

Petar Popovski, et al. "Physical Network Coding in Two-Way Wireless Relay Channels" IEEE Communications Society, Jun. 1, 2007, pp. 707-712.

Peter Larsson, et al. "Coded-Bi-directional Relaying" IEEE Vehicular Technology Conference, vol. 2, pp. 851-855, copyrighted 2006, retrieved on Jul. 24, 2008, from http://www.ericsson.com/technology/research_papers/wireless_access/do c/Coded_Bi-directional_Relaying.pdf.

Chinese Office Action dated Dec. 12, 2011, from corresponding Chinese Application No. 200910008195.3.

Lei Xiao, et al. "Nested Codes with Multiple Interpretations" IEEE 40th Annual Conference on Information Sciences and System, Mar. 24, 2006.

Notice of Reasons for Refusal dated Mar. 21, 2012, from corresponding Japanese Application Nunber 2008-066786, including translation of lines 3 to 5 and 13 to 22 in p. 1, lines 1 to 26 in p. 2, and lines 1 to 15 in p. 3.

\* cited by examiner

FIG. 6A
MOTHER CONSTELLATION FOR MULTICAST TX

| 01 ○ | 00 ○ |
|---|---|
| 11 ⊚ | 10 ○ |

FIG. 6B
NEW CONSTELLATION FOR SYMBOL S1

| 11 ○ | 10 ○ |
|---|---|
| 01 ⊚ | 00 ○ |

FIG. 6C
NEW CONSTELLATION FOR SYMBOL S2

| 00 ○ | 01 ○ |
|---|---|
| 10 ⊚ | 11 ○ |

FIG. 7A
MOTHER CONSTELLATION FOR MULTICAST TX

| 1011 ○ | 1001 ○ | 0001 ○ | 0011 ○ |
|---|---|---|---|
| 1010 ○ | 1000 ○ | 0000 ○ | 0010 ○ |
| 1110 ○ | 1100 ⊚ | 0100 ○ | 0110 ○ |
| 1111 ○ | 1101 ○ | 0101 ○ | 0111 ○ |

FIG. 7B
NEW CONSTELLATION FOR SYMBOL S1

| 0000 ○ | 0010 ○ | 1010 ○ | 1000 ○ |
|---|---|---|---|
| 0001 ○ | 0011 ○ | 1011 ○ | 1001 ○ |
| 0101 ○ | 0111 ⊚ | 1111 ○ | 1101 ○ |
| 0100 ○ | 0110 ○ | 1110 ○ | 1100 ○ |

FIG. 7C
NEW CONSTELLATION FOR SYMBOL S2

| 1101 ○ | 1111 ○ | 0111 ○ | 0101 ○ |
|---|---|---|---|
| 1100 ○ | 1110 ○ | 0110 ○ | 0100 ○ |
| 1000 ○ | 1010 ⊚ | 0010 ○ | 0000 ○ |
| 1001 ○ | 1011 ○ | 0011 ○ | 0001 ○ |

FIG. 10

| RELAYING METHOD | NUMBER OF PHASES | GAIN OF THROUGHPUT (TWO-HOP COMMUNICATION) | RELIABILITY OF LINK | FLEXIBILITY OF COMMUNICATION | THROUGHPUT |
|---|---|---|---|---|---|
| CLASSIC RELAYING | 4 | - | VERY PREFERABLE | VERY HIGH | LOW |
| DF RELAYING | 3 | 33% | PREFERABLE | LOW | MEDIUM |
| AF RELAYING | 2 | 100% | VERY UNPREFERABLE | VERY LOW | CONSIDERABLY HIGH |
| THIS EMBODIMENT | 3 | 33% | PREFERABLE | HIGH | HIGH |

DATA RELAYING APPARATUS, COMMUNICATION APPARATUS, AND DATA RELAYING METHOD

CROSS-REFERENCES TO RELATED APPLICATIONS

This application is based upon and claims the benefit of priority of the prior Japanese Patent Application No. 2008-66786, filed on Mar. 14, 2008, the entire contents of which are incorporated herein by reference.

FIELD

Certain aspects of the present invention discussed herein are related to a data relaying apparatus, a data relaying method, and a communication apparatus which receives relayed data.

BACKGROUND

The simplest method for transmitting data between communication apparatuses is directly transmitting data from one communication apparatus to another communication apparatus. However, this method uses large transmission power to guarantee quality of the wireless communication, for example, when wireless communication is performed between a BS (base station) and a MS (mobile station), a result of which is the power consumption increasing. Alternatively, the size of a wireless cell may be reduced. However the number of base stations BS will increase and ultimately increase the system construction cost.

Accordingly, relay stations are provided between communication apparatuses. Hereinafter, a description will be given for a relaying method employed when a relay station (RS) is provided between a BS and a MS and two-hop transmission is carried out between the base station (BS) and the mobile station (MS).

Figure 11A:
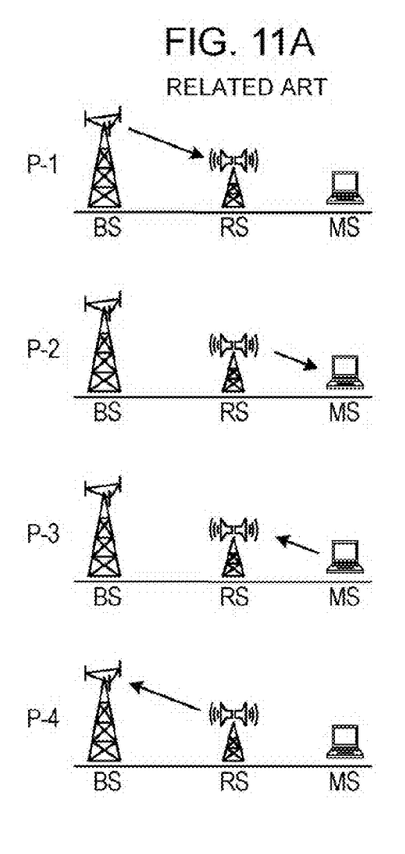
FIGS. 11A-11C are explanatory diagrams for illustrating relaying methods between a base station and a mobile station.

FIG. 11A is a diagram illustrating an example of a relaying method. This relaying method uses the following four phases to bidirectionally transmit data between the BS and the MS. More specifically, in the first phase (P-1), the BS transmits a signal conveying data to the RS. In the second phase (P-2), the RS transmits the signal to the MS. In the third phase (P-3), the MS transmits a signal conveying data to the RS. In the fourth phase (P-4), the RS transmits the signal to the BS. In this relaying method, four communication resources having orthogonal relation are employed. This relaying method is a kind of "DF (Decode-and-Forward) relaying", requiring four phases.

Figure 11B:
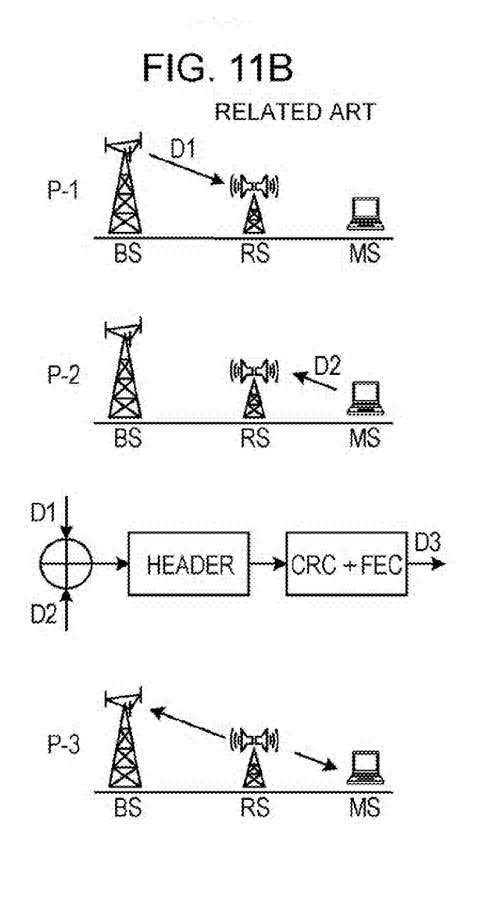

FIG. 11B is a diagram illustrating an example of a relaying method. This relaying method requires the following three phases to bidirectionally transmit signals between the BS and the MS. More specifically, in the first phase (P-1), the BS transmits a signal S1 to the RS via a link D1. In the second phase (P-2), the MS transmits a signal S2 to the RS via a link D2. In the third phase (P-3), the RS decodes the signals S1 and S2, calculates an exclusive OR (XOR) of each respective pair of bits of decoded data to combine them. After that the RS generates symbols corresponding to a modulation method based on the combined data and multicasts the calculated results to the BS and the MS. This relaying method is a kind of "DF (Decode-and-Forward) relaying" but requiring three phases.

In the DF relaying, three orthogonal communication resources are employed. Logically, throughput of two-hop communication is improved by 33% at the maximum in comparison with the relaying method illustrated in FIG. 11A and the throughput may approach the doubled value as the number of hops increases.

Figure 12:
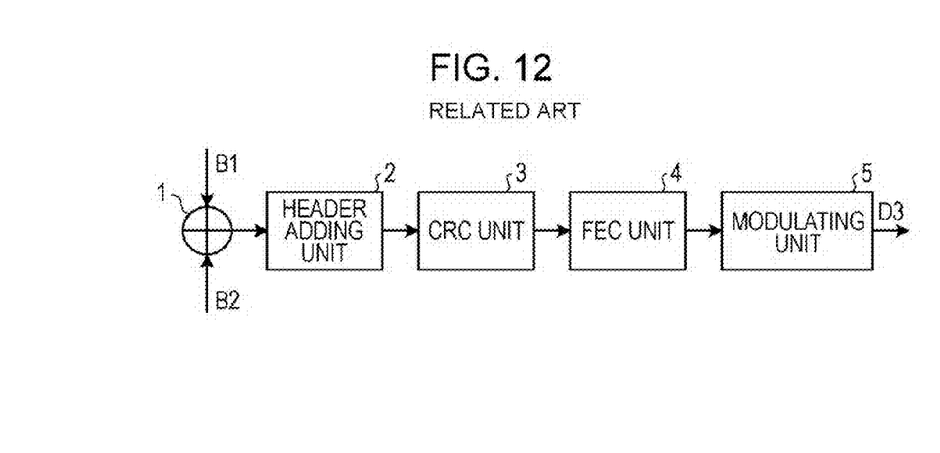
FIG. 12 is a block diagram illustrating a configuration of a network coding section for performing network coding in a relay station.

FIG. 12 illustrates a configuration of a network coding section for combining pieces of information received by the RS via a plurality of communication lines and for transmitting the combined result. As illustrated in the drawings, this network coding section includes an XOR unit 1, a header adding unit 2, a CRC (Cyclic Redundancy Check) unit 3, an FEC (Forward Error Correction) unit 4, and a modulating unit 5 (see, for example, R. Ahlswede, N. Cai, S. Y. R. Li and R. W. Yeung, "Network information flow", IEEE Transactions on Information Theory, Vol. 46, No. 4, pp 1204-1216, July 2000).

The XOR unit 1 calculates an XOR of each respective pair of bits of pieces of decoded data, namely, a pair of bit strings, to generate multicast data. The header adding unit 2 adds a header to the output of the XOR unit 1. The CRC unit 3 adds a CRC bit, for error detection at the receiving side, to the output of the header adding unit 2. The FEC unit 4 performs error correcting coding, such as a turbo encoding, on the output of the CRC unit 3. The modulating unit 5 modulates a symbol corresponding to a modulation method based on the output of the FEC unit 4.

In the DF relaying, the RS performs the XOR calculation on each respective pair of bits (bit by bit calculation) to generate multicast data. Accordingly, the BS can acquire data transmitted from the MS by performing an XOR calculation of the multicast data and the data that the BS has transmitted to the RS. Similarly, the MS can acquire data transmitted from the BS by performing an XOR calculation of the multicast data and the data that the MS has transmitted to the RS. In this manner, bidirectional communication may be realized. Meanwhile, the DF relaying is described in "Coded bi-directional relaying" written by P. Larsson, N. Johansson, K. E. Sunell, the 5th Scandinavian WS on Wireless Ad-Hoc Networks(AdHoc '05), Stockholm, Sweden, May 2005.

Figure 11C:
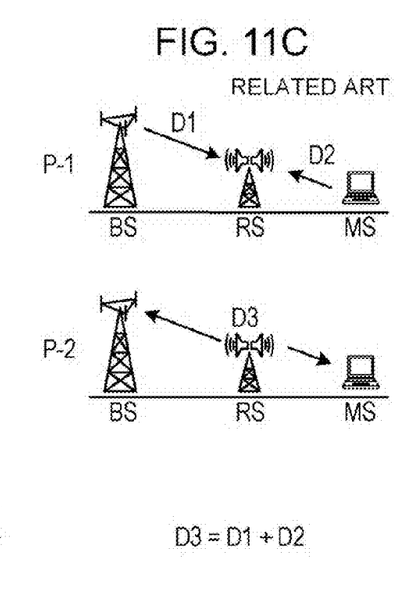

FIG. 11C is a diagram illustrating another relaying method according to the related art. In this relaying method, signals are bidirectionally transmitted between the BS and the MS with the following two phases. More specifically, in the first phase, signal transmission from the BS to the RS and signal transmission from the MS to the RS are simultaneously carried out. In the second phase, the RS amplifies a signal (signal including interference of each other), which is a signal obtained by combining the signals having been simultaneously transmitted from the BS and the MS in a space, and multicasts the amplified signal to the BS and the MS. At this time, the RS does not decode the received signals for transmission. This relaying method is a kind of AF (Amplify-and-Forward) relaying.

The AF relaying employs two orthogonal communication resources. Logically, throughput of the AF relaying may become equal to a double of the throughput of the relaying method illustrated in FIG. 11A at the maximum. Meanwhile, the AF relaying is described in "Wireless network coding by amplify-and-forward for bi-directional traffic flows" written by P. Popovsiki, and H. Yomo, IEEE Communications Letters, Vol. 11, No. 1, pp 16-18, January 2007.

Figure 13:
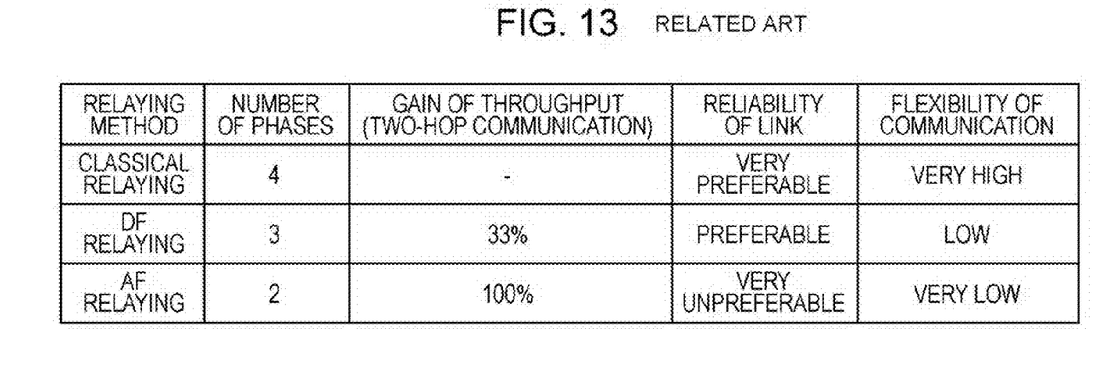
FIG. 13 is a table illustrating a comparison of relaying methods according to the related art.

However, the relaying methods illustrated in FIG. 11A-11C have characteristics summarized in FIG. 13. Since each phase is independently controlled in the conventional relaying method, both of reliability of links and classical flexibility (degree-of-freedom) of communication are high. However, since the number of phases increases in this relaying method, the throughput reduces, as a result of which communication efficiency decreases. Here, "the flexibility of communication" means a degree of freedom for selecting a data transmission modulation scheme and a code rate, i.e., modulation and coding scheme (MCS).

In the DF relaying explained above, pieces of data are received from two links. After two bit strings having the same number of bits resulting from decoding of the received pieces of data are combined by calculating an XOR for two bit strings (bit by bit) to generate one bit string, modulation is performed based on symbols having certain number of bits corresponding to a certain modulation method by dividing this bit string. Accordingly, one modulation scheme is selected at the time of multicast of the bit string D3 to the BS and the MS. For example, even though up to 16QAM (16 Quadrature Amplification Modulation) is available for transmission from the RS to the BS and up to QPSK (Quadrature Phase Shift Keying) is available for transmission from the RS to the MS, the QPSK is selected for both the transmissions to satisfy transmission requirements of both the transmissions.

More specifically, when communication qualities of a pair of links are unbalanced, data transmission via a link having the preferable communication quality is restricted by data communication via a link having the unpreferable communication quality. That is, the flexibility of communication decreases.

The AF relaying explained above does not have the flexibility of communication. Additionally, since the noises are also amplified in the RS in an environment with many noises, communication performance significantly drops. Although introduction of, for example, a DNF (Denoise-and-Forward) relaying method reduces the seriousness of this problem, the introduction of the DNF relaying method also complicates a configuration of the RS.

SUMMARY

Accordingly, in one aspect, an object of one embodiment of the invention is to improve flexibility of communication.

According to one aspect of the invention, a data relaying apparatus, for relaying data bidirectionally transmitted between a first communication apparatus and a second communication apparatus, includes a first symbol string generator configured to generate, in accordance with a first modulation method, a first symbol string from first data transmitted from the second communication apparatus;

a second symbol string generator configured to generate, in accordance with a second modulation method, a second symbol string from second data transmitted from the first communication apparatus; and a combining unit configured to combine a first symbol of the first symbol string and a second symbol of the second symbol string by calculating an exclusive OR on the first symbol and the second symbol to generate a third symbol string to be multicasted to the first communication apparatus and the second communication apparatus.

According to one aspect of the invention, a communication apparatus for receiving multicast data relayed by a data relaying apparatus with network coding includes a decoder configured to decode the multicast data, generated by the data relaying apparatus by calculating an exclusive OR for each respective pair of symbols, using transmission data transmitted to the data relaying apparatus from the communication apparatus to acquire reception data.

According to one aspect of the invention, a data relaying method for relaying data bidirectionally transmitted between a first communication apparatus and a second communication apparatus, includes generating, in accordance to a first modulation method, a first symbol string from first data transmitted from the second communication apparatus; generating, in accordance with a second modulation method, a second symbol string from second data transmitted from the first communication apparatus;

combining a first symbol of the first symbol string and a second symbol of the second symbol string by calculating an exclusive OR on the first symbol and the second symbol to generate a third symbol string; multicasting data based on the third symbol string to the first communication apparatus and the second communication apparatus; receiving the third symbol string multicasted by the data relaying apparatus by the first communication apparatus and the second communication apparatus; decoding the third symbol string received using the first data by the first communication apparatus; and decoding the third symbol string received using the second data by the second communication apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments for carrying out a data relaying apparatus, a data relaying method, and a communication apparatus relating to the present invention are described with reference to the figures.

In an embodiment, it is assumed that a relaying apparatus generates symbol data corresponding to respective modulation methods for each of a plurality of received bit strings and combines the plurality of pieces of symbol data. With such a configuration, symbol data can be generated for each of the plurality of bit strings. When a user wants to employ different modulation schemes for each symbol data, this configuration allows symbol data to be generated for each of the plurality of bit strings in accordance with different modulation methods (schemes).

[Embodiment]

Figure 1:
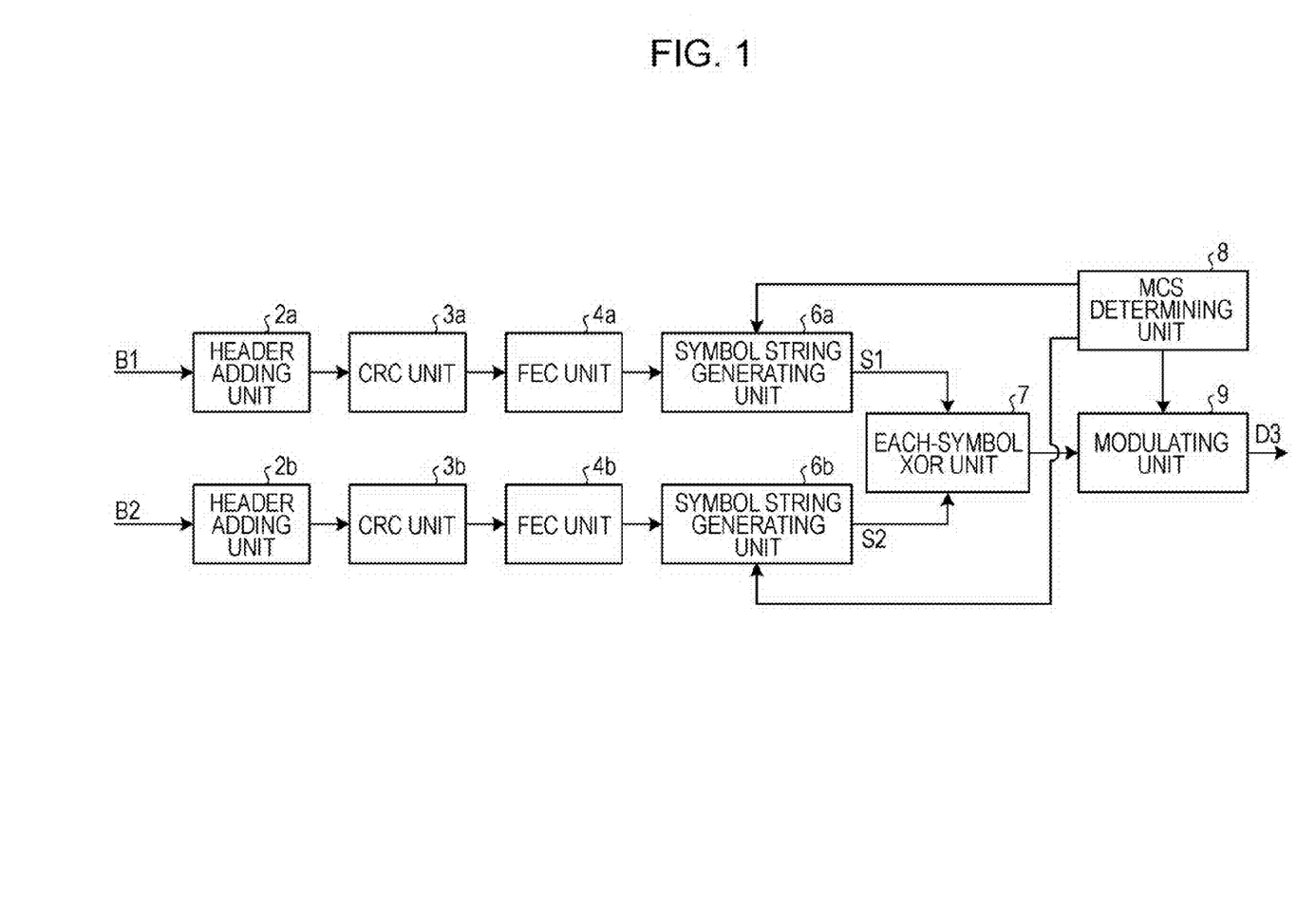
FIG. 1 is a configuration example of a network coding section of a relay station according to an embodiment.

First, a network coding section of a relay station according to this embodiment is described. FIG. 1 is a configuration example of a network coding section of a relay station according to this embodiment. As illustrated in FIG. 1, this network coding section includes header adding units 2a and 2b, CRC (Cyclic Redundancy Check) units 3a and 3b (error detection encoder), FEC (Forward Error Correction) units 4a and 4b (error correction encoder), symbol string generating units 6a and 6b (symbol string generator), an each-symbol XOR unit 7 (exclusive OR calculation unit), an MCS (Modulation and Coding Scheme) determining unit 8 (modulation and coding method determining unit), and a modulating unit 9 (modulator). The header adding units 2a and 2b add headers to bit strings B1 and B2, which have been transmitted from a mobile station and a base station and demodulated by the relay station, respectively. The CRC units 3a and 3b add CRC bits to the outputs of the header adding units 2a and 2b, respectively, for error detection at the receiving side. The FEC units 4a and 4b perform error correction encoding, such as a turbo encoding. FEC bits may be added to the outputs of the CRC units 3a and 3b, respectively, for error correction at the receiving side.

The symbol string generating units (symbol string generator) 6a and 6b generate symbol strings from the bit strings output from the FEC units 4a and 4b, respectively, on the basis of modulation method and/or coding method of a link between the relay station and the base station and a link between the relay station and the mobile station determined by the MCS determining unit 8.

The each-symbol XOR unit 7 performs an XOR operation on each respective pair of symbols of the symbol strings generated by the symbol string generating units 6a and 6b to generate a multicast symbol. A symbol S1 generated by the symbol string generating unit 6a has M0 bits, whereas a symbol S2 generated by the symbol string generating unit 6b has M1 bits. More specifically, the symbols S1 and S2 are represented as $\{\alpha_{0,0}, \alpha_{0,1}, \ldots, \alpha_{0,M0-1}\}$ and $\{\alpha_{1,0}, \alpha_{1,1}, \ldots, \alpha_{1,M1-1}\}$, respectively. Here, $\alpha_{n,m} = \{0, 1\}$ and n=0, 1. Additionally, the multicast symbol is represented as $\{\beta_0, \beta_1, \ldots, \beta_{M-1}\}$, where M=Max(M0, M1).

In this case, $$\beta_m = \begin{cases} \alpha_{0,m} XOR \alpha_{1,m} & m = 0, 1, \ldots, \min(M0, M1) - 1 \\ \alpha_{n,m} & m = \min(M0, M1), \ldots \max(M0, M1) - 1 \end{cases} \quad (1)$$

is obtained. If M0 is larger than M1 (M0>M1), n is equal to 0 (n=0). Otherwise, n is equal to 1 (n=1). The multicast symbol $\{\beta_0, \beta_1, \ldots, \beta_{M-1}\}$ is mapped to a constellation diagram (signal constellation diagram) whose modulation order equals to $\log_2 \max(M0, M1)$.

Figure 2:
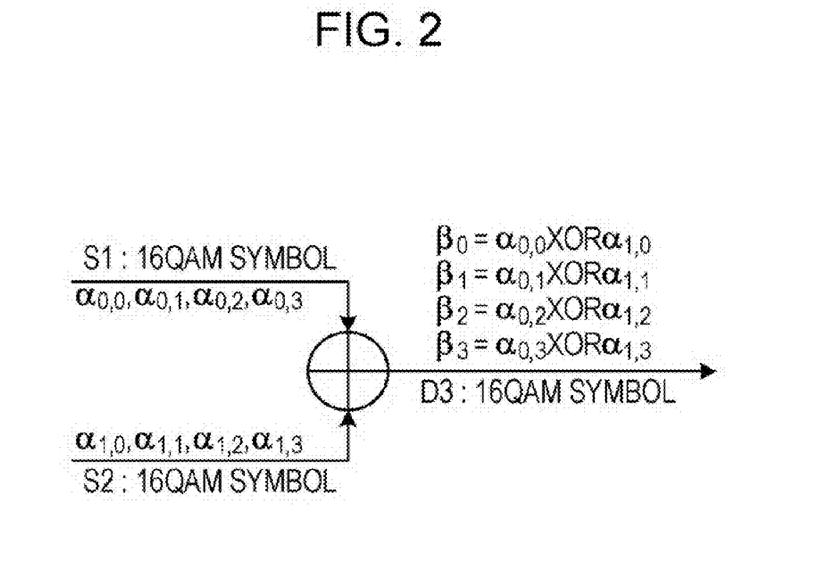
FIG. 2 is an example (1) of an XOR operation performed on each respective pair of symbols by an each-symbol XOR unit.
Figure 3:
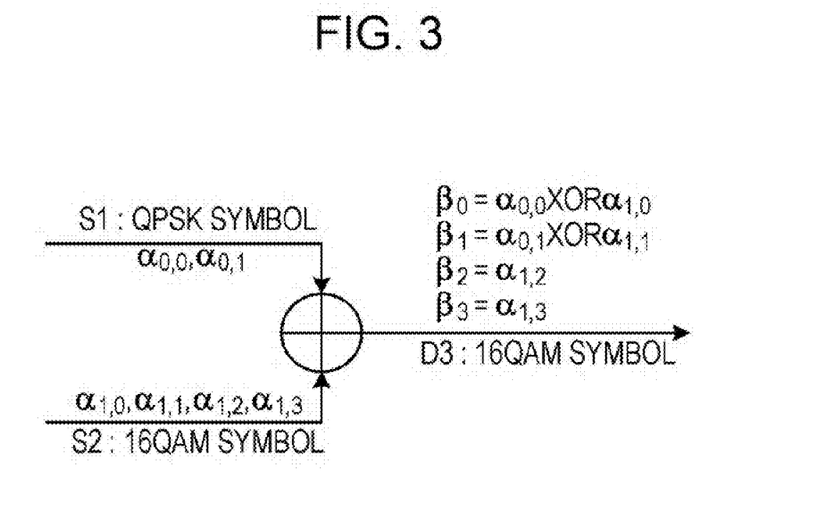
FIG. 3 is an example (2) of an XOR operation performed on each respective pair of symbols by an each-symbol XOR unit.

FIGS. 2 and 3 illustrate examples of XOR calculations performed by the each-symbol XOR unit 7 for each respective pair of symbols. More specifically, FIG. 2 illustrates an XOR operation between two 16QAM symbols, whereas FIG. 3 illustrates an XOR operation between a QPSK symbol and a 16QAM symbol. Since the bit lengths of the two symbols are the same in FIG. 2, an XOR calculation is performed on each respective pair of bits of the two symbols. That is, the first (second, third, fourth) bit of the 16QAM symbol of S1 and the first (second, third, fourth) bit of the 16QAM symbol of S2 are used for XOR calculation. Since the bit lengths of the two symbols differ in FIG. 3, XOR operations are performed on first two respective pairs of bits of the two symbols and the remaining two bits of the longer symbol are used as they are. For example, the first (second) bit of the QPSK symbol of S1 and the first (second) bit of the 16QAM symbol of S2 are used for XOR calculation, and the third and fourth bit of the 16QAM symbol of S2 are not used for XOR calculation.

The each-symbol XOR unit 7 performs an XOR operation for each symbol pair to generate a multicast symbol in this manner, whereby a disadvantage of the DF relaying that communication quality is restricted by data transmission of a link having unpreferable communication quality can be overcome. Additionally, the modulation order of the multicast symbol may be adjusted to the higher modulation order of two symbols.

When the modulation orders differ between two symbols, the each-symbol XOR unit 7 performs the XOR calculation from MSB (Most Significant Bit), thereby guaranteeing the higher quality for the symbol having the lower modulation order. The LSB bits or other bits may also be used for XOR calculation instead of the MSB.

The MCS determining unit 8 determines a MCS (Modulation and Coding Scheme) based on spectrum efficiencies of a link between a relay station and a base station (hereinafter, referred to as "a relay station-base station link") and a link between the relay station and a mobile station (hereinafter, referred to as "a relay station-mobile station link"). More specifically, the MCS determining unit 8 determines the modulation and coding scheme in the following manner.

Figure 14:
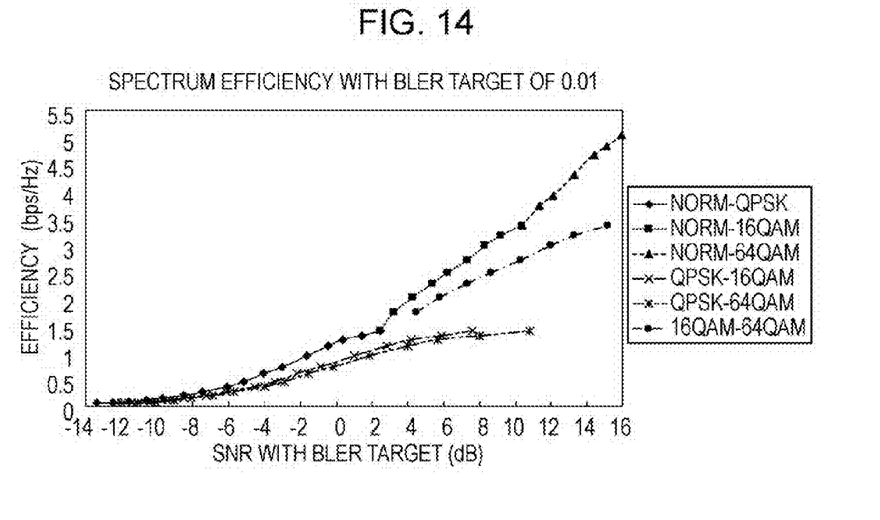
FIG. 14 is a diagram illustrating spectrum efficiency (without overlapping)
Figure 15:
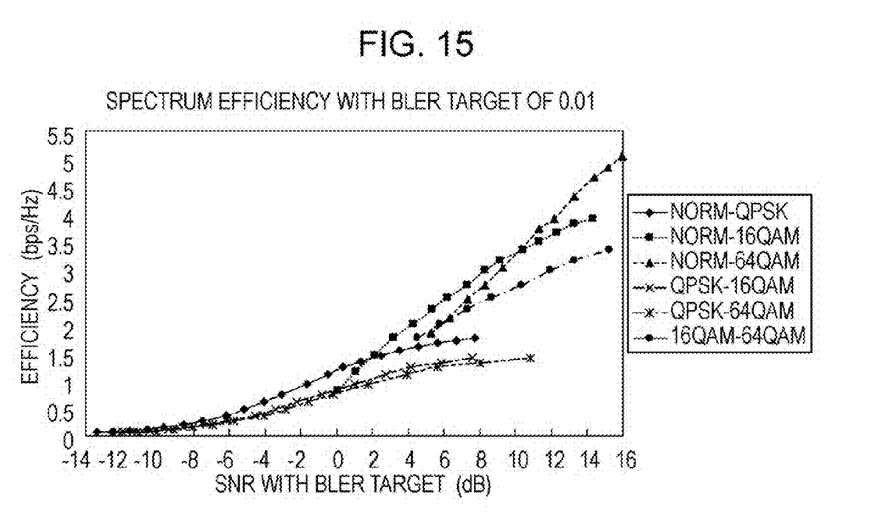
FIG. 15 is a diagram illustrating spectrum efficiency (with overlapping).

The spectrum efficiency of the relay station-base station link and the spectrum efficiency of the relay station-mobile station link are represented as $C(BS)k1,k2(\Gamma BS)$ and $C(MS)k1,k3(\Gamma MS)$, which are functions of SINR (Signal-to-Interference plus Noise power Ratio) $\Gamma BS$ and $\Gamma MS$ of the links, respectively. Here, k1 and k2 are transmission and reception modulation orders, respectively, and $k1 \geq k2$, $k1 \geq k3$, and k1, k2, K3=\{2, 4, 6\}. Additionally, overlapping is caused in design of an MCS table. More specifically, MCSs having different modulation orders and code rates for an identical SINR are provided. FIGS. 14 and 15 illustrate cases with and without overlapping, respectively.

The MCS determining unit 8 determines the modulation and coding scheme by performing global search of k1, k2, and k3 regarding a case with overlapping shown in FIG. 15 using Equation (2).

$$\max_{k_1,k_2,k_3} (C_{(BS)k_1,k_2}(\Gamma_{BS}) + C_{(MS)k_1,k_3}(\Gamma_{MS})) \quad (2)$$

When the modulation and coding scheme is determined, it is preferable to generally set the modulation order of both of the relay station-base station link and the relay station-mobile station link to the same value regardless of the code rate if possible. However, when the SINR is low, the performance may decrease in response to switching of the QPSK into the higher-order QAM because of constellation noises of the higher-order QAM.

Figure 4:
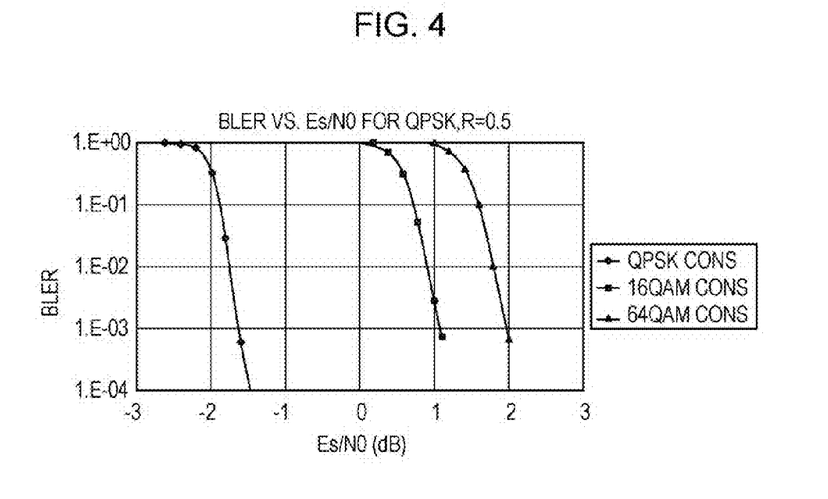
FIG. 4 illustrates a block error rate BLER of QPSK modulation of a code rate 1/2 against a symbol-to-noise ratio (Es/N0)

FIG. 4 is a diagram illustrating a block error rate (BLER) of QPSK modulation of a code rate 1/2 against a symbol-tonoise ratio (Es/N0). Here, the noise is the AWGN (Additive White Gaussian Noise). FIG. 4 illustrates data transmission cases of ordinal QPSK constellation, 16QAM constellation modulated with the QPSK symbol, and 64QAM constellation modulated with the QPSK symbol.

Referring to FIG. 4, the symbol-to-noise ratio Es/N0 needed to satisfy BLER=0.01 is equal to −1.75 dB in the ordinal QPSK, 0.9 dB in the 16QAM, and 1.8 db in the 64QAM. Accordingly, a difference between the Es/N0 values of the ordinal QPSK and the 16QAM and a difference between the Es/N0 values of the ordinal QPSK and the 64QAM are equal to 2.65 dB and 3.55 dB, respectively, which are losses.

To cope with such performance degradation, repeated coding or trellis code modulation may be performed. More specifically, when different constellations are combined, a lower-order constellation is converted into a higher-order constellation by performing the repeated coding or the trellis code modulation. For example, a 16QAM symbol is obtained by repeating two bits of a QPSK symbol once and a 64QAM symbol is obtained by repeating two bits of the QPSK symbol twice.

Referring back to FIG. 1, the modulating unit (modulator) 9 modulates a multicast symbol in accordance with the modulation and coding scheme determined by the MCS determining unit 8.

Figure 5:
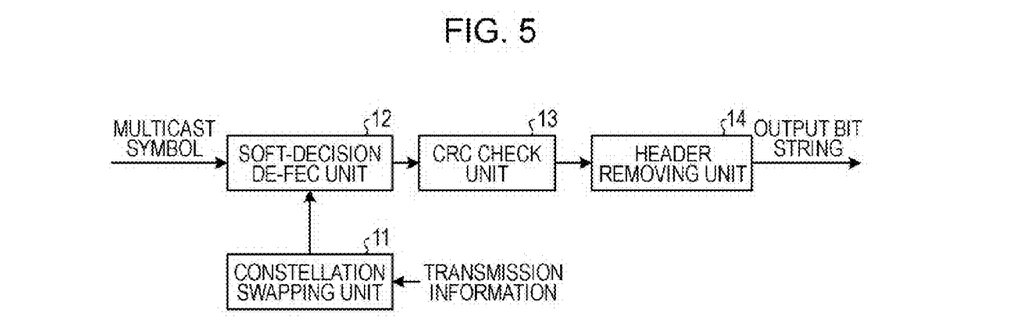
FIG. 5 is a configuration example of a network decoding section.

Next, a network decoding section for decoding multicast symbols is described. Both of the base station and the mobile station include a network decoding section. FIG. 5 is a configuration example of a network decoding section. As shown in the drawing, the network decoding section includes a constellation swapping unit 11, a soft-decision de-FEC unit 12, a CRC check unit 13, and a header removing unit 14.

The constellation swapping unit 11 swaps the constellation on the basis of transmission information. More specifically, the constellation swapping unit 11 swaps the constellation in the following manner.

It is assumed that $a_0 a_1 \ldots a_{M-1}$ is set as one of constellation points used by the relay station for multicasting and is referred to as a mother constellation. The number of constellation points is equal to $2^M$ and $a_m = \{0,1\}$ ($0 \leq m \leq M-1$).

Additionally, a constellation point of a new symbol, which is formed based on transmission symbol S2 of the base station and used for demodulating multicast symbol, is set to $a_{0,0} a_{0,1} \ldots a_{0,M-1}$. Similarly, a constellation point of a new symbol, which is formed based on transmission symbols S1 of the mobile station and used for demodulating multicast symbol, is set to $a_{1,0} a_{1,1} \ldots a_{1,M-1}$.

In addition, the symbol S1 includes transmission bits of $\{\alpha_{0,0}, \alpha_{0,1}, \ldots, \alpha_{0,M0-1}\}$, whereas the symbol S2 includes transmission bits of $\{\alpha_{1,0}, \alpha_{1,1}, \ldots, \alpha_{1,M1-1}\}$. Here, M=max (M0, M1).

In this case, the constellation points $a_{0,0} a_{0,1} \ldots a_{0,M-1}$ and $a_{1,0} a_{1,1} \ldots a_{1,M-1}$ are determined by Equation (3).

$$a_{n,m} = \begin{cases} a_m XOR \alpha_{(n+1) \bmod 2, m} & m = 0, 1, \ldots, \min(M0, M1) - 1 \\ a_m & m = \min(M0, M1), \ldots, M_n - 1 \end{cases} \quad (3)$$

Equation (3) indicates that the new constellation point is based on the mother constellation and the transmission information. More specifically, the constellation swapping unit 11 swaps the constellation using the mother constellation and the transmission information.

Figure 6A:
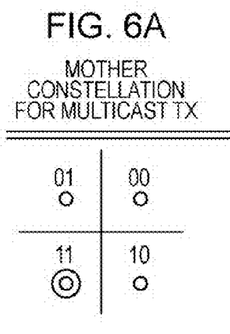
FIGS. 6A-6C are diagrams (1) illustrating an example of constellation swapping.

FIGS. 6A-8C are examples of constellation swapping. FIGS. 6A-6C illustrate a case where both symbols are QPSK symbols. Here, the symbol S1 is "01", whereas the symbol S2 is "10". FIGS. 6A, 6B, and 6C illustrate a mother constellation, a new constellation for the symbol S1, and a new constellation for the symbol S2, respectively.

Figure 6B:
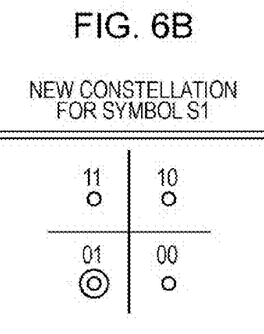
Figure 6C:
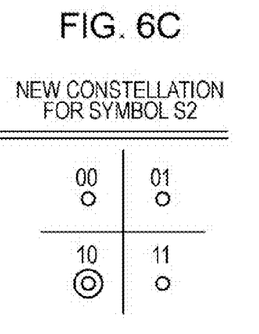

The relay station determines an XOR of the symbol S1 "01" and the symbol S2 "10" to generate a multicast symbol "11".

The base station updates the constellation using the mother constellation and the symbol S2, namely "10", to generate a new constellation point "01". More specifically, the symbol S1 is mapped to the same position as that of the multicast symbol.

Similarly, the symbol S2 is mapped to the same position as that of the multicast symbol in the mobile station. Accordingly, the base station and the mobile station can readily decode the multicast symbol using the new constellations shown in FIGS. 6B and 6C, respectively.

Figure 7A:
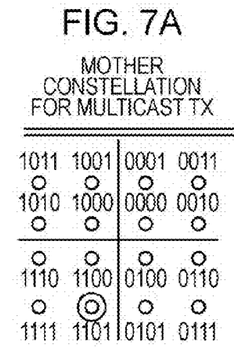
FIGS. 7A-7C are diagrams (2) illustrating an example of constellation swapping.
Figure 7B:
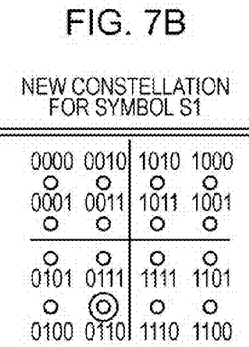
Figure 7C:
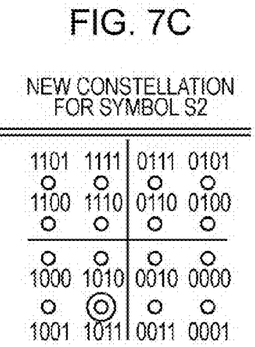

FIGS. 7A-7C illustrate a case where both symbols are 16QAM symbols. Here, the symbol S1 is "0110", whereas the symbol S2 is "1011". Accordingly, the multicast symbol is "1101". FIGS. 7A, 7B, and 7C illustrate a mother constellation, a new constellation for the symbol S1, and a new constellation for the symbol S2, respectively.

Figure 8A:
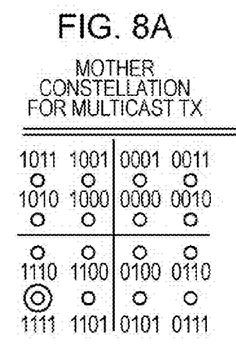
FIGS. 8A-8C are diagrams (3) illustrating an example of constellation swapping.
Figure 8B:
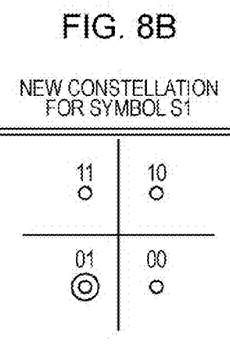
Figure 8C:
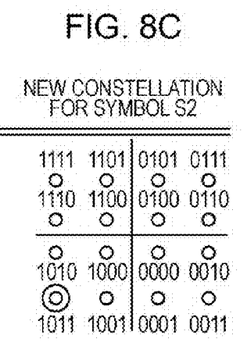

FIGS. 8A-8C illustrate a case where the symbol S1 is a QPSK symbol and the symbol S2 is a 16QAM symbol. Here, the symbol S1 is "01", whereas the symbol S2 is "1011". Accordingly, the multicast symbol is "1111". FIGS. 8A, 8B, and 8C illustrate a mother constellation, a new constellation for the symbol S1, and a new constellation for the symbol S2, respectively.

Referring back to FIG. 5, the soft-decision de-FEC unit (error correction decoder) 12 decodes the multicast symbol using the constellation swapped by the constellation swapping unit 11 and performs error detection/correction using the FEC. This soft-decision de-FEC unit 12 decodes the multicast symbol using soft decision.

The CRC check unit 13 performs CRC check on a bit string having undergone the FEC-employing error detection/correction. The header removing unit 14 removes a header from the bit string having undergone the CRC check.

The constellation swapping unit 11 swaps the constellation using the mother constellation and the transmission information in this manner, whereby the network decoding section can readily decode the multicast symbol.

Figure 9:
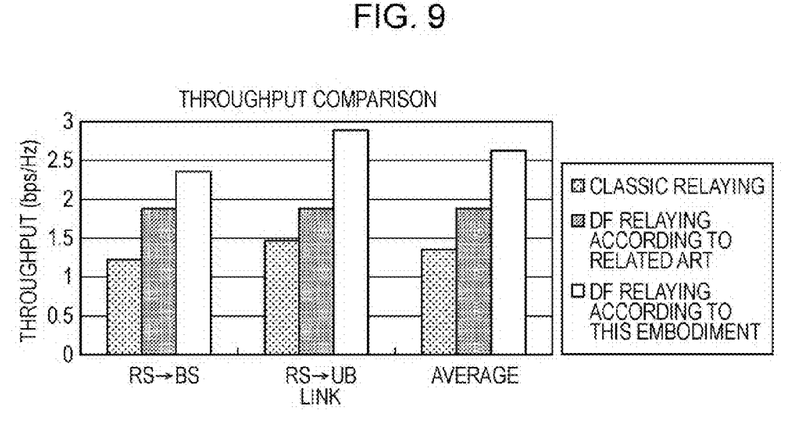
FIG. 9 illustrates comparison results of simulated throughput.

FIG. 9 illustrates comparison results of simulated throughput. FIG. 9 illustrates that throughput improves in the DF relaying method according to this embodiment in comparison with the DF relaying method according to the related art, namely, a method for performing an XOR operation for each bit to generate multicast data. The throughput improvement ratio is 39% in this simulation.

Figure 10:
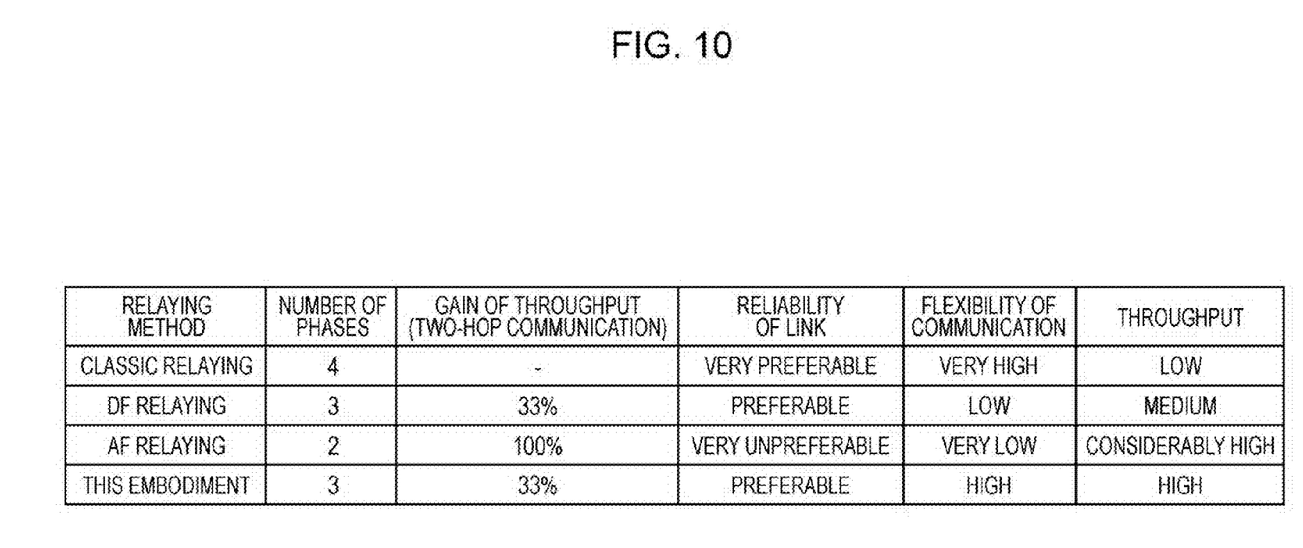
FIG. 10 is a table illustrating a comparison of a relaying method according to an embodiment with relaying methods according to the related art.

FIG. 10 is a table showing a comparison of a relaying method according to this embodiment and relaying methods according to the related art. As illustrated in the table, flexibility of communication and throughput may be improved in the relaying method according to this embodiment in comparison with the DF relaying method according to the related art.

As described above, in this embodiment, the symbol string generating units 6a and 6b of the relay station generate symbol strings on the basis of modulation and coding schemes of the relay station-base station link and the relay station-mobile station link, respectively. The each-symbol XOR unit 7 performs an XOR operation on each symbol pair of the symbol strings generated by the symbol string generating units 6a and 6b to generate a multicast symbol. Accordingly, the disadvantage of the DF relaying method according to the related art that the communication quality is restricted by the data transmission of the link having the unpreferable communication quality may be overcome and flexibility of communication can be improved. As shown by the simulation result, the relaying method according to this embodiment may improve the throughput in comparison with the DF relaying method according to the related art.

Additionally, in this embodiment, the constellation swapping unit 11 swaps a constellation using a mother constellation and transmission information. The soft-decision de-FEC unit 12 then decodes a multicast symbol using the swapped constellation. Accordingly, it is possible to readily decode the multicast symbol.

Network coding using an XOR operation for each symbol may improve the flexibility of communication without complicating conventional network coding and decoding.

Although the description has been mainly given for a case of using QPSK and 16QAM as modulation and coding schemes in this embodiment, the present invention is not limited to these modulation and coding schemes. The present embodiment may be applied similarly to a case of using other modulation and coding schemes, such as 32QAM and 64QAM, for example.

According to the above-described embodiment, the flexibility of communication can be improved.

According to one aspect of the embodiment, application of elements, expressions, and given combinations of the elements of the invention to a method, an apparatus, a system, a computer program, a recording medium, and a data structure is also effective to solve the above-described problems.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that various changes, substitutions, and alterations could be made hereto without departing from the spirit and scope of the invention.

What is claimed is:

1. A data relaying apparatus for relaying data bidirectionally transmitted between a first communication apparatus and a second communication apparatus, the data relaying apparatus comprising:
    a first symbol string generator configured to generate, in accordance with a first modulation method, a first symbol string from first data transmitted from the second communication apparatus;
    a second symbol string generator configured to generate, in accordance with a second modulation method, a second symbol string from second data transmitted from the first communication apparatus;
    a combining unit configured to combine a first symbol and a second symbol from the first symbol string and the second symbol string, respectively, by calculating an exclusive OR on the first symbol and the second symbol to generate a third symbol string to be multicasted to the first communication apparatus and the second communication apparatus; and
    a modulation and coding method determining unit configured to determine the first modulation method and a first coding method and the second modulation method and a second coding method so that a sum of spectrum efficiencies of a first link to the first communication apparatus and a second link to the second communication apparatus becomes maximum,
    wherein the first modulation and the second modulation are controlled to be same by adjusting code rates of the first and second symbol strings.

2. A data relaying apparatus for relaying data bidirectionally transmitted between a first communication apparatus and a second communication apparatus, the data relaying apparatus comprising:
    a first symbol string generator configured to generate, in accordance with a first modulation method, a first symbol string from first data transmitted from the second communication apparatus;
    a second symbol string generator configured to generate, in accordance with a second modulation method, a second symbol string from second data transmitted from the first communication apparatus; and
    a combining unit configured to combine a first symbol and a second symbol from the first symbol string and the second symbol string, respectively, by calculating an exclusive OR on the first symbol and the second symbol to generate a third symbol string to be multicasted to the first communication apparatus and the second communication apparatus,
    wherein, when the first modulation method and the second modulation method are different, the first symbol string generator or the second symbol string generator generates the first symbol string or the second symbol string by repeated coding or trellis coding to make a lower modulation order match a higher modulation order.

3. A data relaying method for relaying data bidirectionally transmitted between a first communication apparatus and a second communication apparatus, the data relaying method comprising:
    generating, in accordance with a first modulation method, a first symbol string from first data transmitted from the second communication apparatus;
    generating, in accordance with a second modulation method, a second symbol string from second data transmitted from the first communication apparatus;
    combining a first symbol and a second symbol from the first symbol string and the second symbol string, respectively, by calculating an exclusive OR on the first symbol and the second symbol to generate a third symbol string;
    determining the first modulation method and a first coding method and the second modulation method and a second coding method so that a sum of spectrum efficiencies of a first link to the first communication apparatus and a second link to the second communication apparatus becomes maximum, wherein the first modulation and the second modulation are controlled to be same by adjusting code rates of the first and second symbol strings;
    multicasting data based on the third symbol string to the first communication apparatus and the second communication apparatus;
    receiving the third symbol string multicasted by the data relaying apparatus by the first communication apparatus and the second communication apparatus;
    decoding the third symbol string received using the first data by the first communication apparatus; and
    decoding the third symbol string received using the second data by the second communication apparatus.

4. A data relaying method for relaying data bidirectionally transmitted between a first communication apparatus and a second communication apparatus, the data relaying method comprising:

generating, in accordance with a first modulation method, a first symbol string from first data transmitted from the second communication apparatus;

generating, in accordance with a second modulation method, a second symbol string from second data transmitted from the first communication apparatus;

combining a first symbol and a second symbol from the first symbol string and the second symbol string, respectively, by calculating an exclusive OR on the first symbol and the second symbol to generate a third symbol string;

multicasting data based on the third symbol string to the first communication apparatus and the second communication apparatus;

receiving the third symbol string multicasted by the data relaying apparatus by the first communication apparatus and the second communication apparatus;

decoding the third symbol string received using the first data by the first communication apparatus; and decoding the third symbol string received using the second data by the second communication apparatus, wherein, when the first modulation method and the second modulation method are different, the generating of first symbol string or the generating of second symbol string is performed by repeated coding or trellis coding to make a lower modulation order match a higher modulation order.

\* \* \* \* \*